United States Patent [19]
Modi et al.
[11] Patent Number: 5,006,168
[45] Date of Patent: Apr. 9, 1991

[54] WATER SOLUBLE POLYMERS AS ALCOHOL REPLACEMENT IN LITHOGRAPHIC FOUNTAIN SOLUTIONS

[75] Inventors: Jashawant J. Modi; Bruce E. Banyai, both of Hockessin, Del.

[73] Assignee: Aqualon Company, Wilmington, Del.

[21] Appl. No.: 331,741

[22] Filed: Apr. 3, 1989

[51] Int. Cl.[5] .................... C09K 3/18
[52] U.S. Cl. .................... 106/2; 101/451
[58] Field of Search .................... 106/2; 101/451

[56] References Cited

U.S. PATENT DOCUMENTS

| | | | |
|---|---|---|---|
| 3,354,824 | 11/1967 | Griffith et al. | 101/451 |
| 3,728,331 | 4/1973 | Sauage | 260/231 |
| 3,877,372 | 4/1975 | Leeds | 106/2 |
| 4,200,688 | 4/1980 | Garrett et al. | 430/302 |
| 4,214,531 | 7/1980 | Garrett et al. | 106/2 |
| 4,278,467 | 7/1981 | Fadner | 106/2 |
| 4,548,645 | 10/1985 | Thiebaut | 106/2 |
| 4,641,579 | 2/1987 | Bernstein | 101/451 |
| 4,719,172 | 1/1988 | Matsumoto et al. | 106/2 |
| 4,731,119 | 3/1988 | Toyama et al. | 106/2 |
| 4,764,213 | 8/1988 | Guenter et al. | 106/2 |
| 4,854,969 | 8/1989 | Bassemir et al. | 106/2 |

FOREIGN PATENT DOCUMENTS 0091601 10/1983 European Pat. Off. .

*Primary Examiner*—Mark L. Bell
*Assistant Examiner*—Helene Klemanski
*Attorney, Agent, or Firm*—James K. Luchs

[57] ABSTRACT

Isopropyl alcohol is partially or completely replaced in an acid fountain solution for lithographic printing by a hydroxypropylcellulose or similar polymer with a molecular weight below 100,000 where a 30% by weight solution of the polymer has a viscosity below 4000 cps at 25°. Printing quality is improved and scumming is controlled when a hydrogen peroxide degraded hydroxypropylcellulose or hydrophobically modified hydroxyethylcellulose replaces alcohol in a fountain solution.

9 Claims, No Drawings

WATER SOLUBLE POLYMERS AS ALCOHOL REPLACEMENT IN LITHOGRAPHIC FOUNTAIN SOLUTIONS

FIELD OF THE INVENTION

The invention relates to fountain solutions containing alcohol used for lithographic printing. In particular the invention relates to an improved fountain solution where all or part of the alcohol is replaced by a water soluble polymer.

BACKGROUND OF THE INVENTION

Fountain solutions containing isopropyl alcohol are well known for use with presensitized lithographic printing plates. Once the desired image and non-image areas are developed on the plate, the plate is coated with gum etch and/or gumming solution. The function of the gum etch and gumming solution is to desensitize the non-image area so that it does not pick up ink during the printing process. The gum etch solution generally consists of gum arabic, phosphoric acid and preservatives and has a pH around 3.0. The gumming solution generally consists of gum arabic and preservative and has a pH around 5.0. But during the printing process the desensitizing coating starts to wears out, thus requiring the application of a fountain solution to apply fresh coating of desensitizing gum.

Scumming, or pickup of ink in non-image areas, can be overcome by applying a fountain solution during the printing process. A thin coating of desensitizing solution known as fountain solution is applied to the plate during printing by a damping system. The fountain solution keeps the non-image areas of the plate desensitized if applied at proper level.

There are three different types of fountain solution: acid, neutral and alkaline. The alkaline and neutral are mainly used in newspaper printing. The acid fountain solution, the most widely used, consists of:

1. Desensitizing agent such as gum arabic, AMBERGUM ® water soluble polymer, etc.
2. Acid such as phosphoric, citric, lactic, tannic, etc.
3. Buffer and corrosion inhibitors such as nitrate, dichromate and phosphate.
4. Wetting agent such as alcohol, surfactant or glycol ether.
5. Preservative.

In acid fountain solutions the pH is kept around 5.0 and isopropyl alcohol generally is used as the wetting agent. The level of alcohol varies between 10–25% by volume depending on the type of press, damping system and temperature at which it is used.

The alcohol in the fountain solution performs the following functions:

1. Lowering surface tension to provide better and more uniform wetting of the printing plate with a thinner film of fountain solution.
2. Providing more stable damping, and thus less color variation.
3. Giving a brighter color effect.
4. Providing less ink emulsification.
5. Allowing a rapid achievement of ink/water balance.
6. Preventing moisture transfer to the printing blanket and thus to the paper stock, i.e. less curling of the paper.
7. Eliminating fiber deposits from damping roller covers.

The fountain solutions in which alcohol is added by the press people are generally known as two-step fountain solutions. There are some commercial fountain solutions which contain alcohol substitutes and do not require alcohol addition. These are known as one-step fountain solutions.

Yet in spite of all the advantages related to the use of alcohol in commercial fountain solutions, there were some disadvantages such as:

1. Some color pigments in ink were not compatible with an alcohol system.
2. The lacquer-type image base of the presensitized plate could be damaged by alcohol.
3. The high volatility of alcohol provides a risk for building up vapor to toxic and explosive levels in non-ventilated areas. Government pressure on the printing industry to reduce the use of volatile organic compounds (VOC) is increasing.

Thus, prior to the present invention a need had existed to reduce or eliminate the alcohol content of commercial fountain solutions. The present invention is directed to filling that need by providing water soluble polymers which can function to replace or reduce alcohol without adverse effect on the printing process as well as to improve the performance of non-alcoholic fountain solutions.

SUMMARY OF THE INVENTION

An improved lithographic printing fountain solution comprises:

(1) an aqueous solution of a modified cellulose with a pH below 6.5 wherein a 30% by weight solution of the modified cellulose has a viscosity below 4000 cps at 25° C.;
(2) a desensitizing agent;
(3) an acid and a buffer; and
(4) a wetting agent or surfactant.

An alternate mode of the invention provides that (4) (wetting agent) can be alcohol in printing applications where it has not been possible to completely eliminate alcohol. Also a preservative may be included in the fountain solution.

A method for printing comprises the steps:

(1) preparing an aqueous solution of hydroxypropylcellulose or hydrophobically modified hydroxyethylcellulose having a molecular weight below 100,000;
(2) combining the cellulose solution with ingredients to prepare an acid fountain solution; and
(3) applying the acid fountain solution to a printing plate to control scumming and to improve printing quality.

Preferred ingredients for either the product or process of the invention include: gum arabic, AMBERGUM ® water soluble polymer available from Aqualon Company, phosphoric acid, phosphate buffer, preservative and hydroxypropylcellulose.

DETAILED DESCRIPTION OF THE INVENTION

Alcohols have long been an accepted ingredient in fountain solutions used to prevent scumming during lithographic printing. Despite the desirability of reducing or eliminating alcohol in these fountain solutions, it remained for the present invention to satisfy this need in the printing field.

It has been discovered that a hydroxypropylcellulose solution can be prepared which can partially substitute or even completely replace alcohol or alcohol substitutes in commercially useful fountain solutions. This can be accomplished when the hydroxypropylcellulose has a molecular weight in the range of 5,000 to 100,000 such that a 30% solution of the solid has a viscosity below 4000 cps at 25° C.

Hydroxypropylcellulose and hydrophobically modified hydroxyethylcellulose starting materials useful in the invention are described in the Aqualon Company brochures 250-2C and 250-18C. However, to meet the solution viscosity requirements for fountain solutions the molecular weight must be reduced below about 100,000 as measured by intrinsic viscosity. Viscosity reduction can be accomplished by treatment with an oxidizing agent such as hydrogen peroxide or potassium persulfate. For example, U.S. Pat. No. 3,728,331 describes a process for reducing the viscosity of a cellulose ether with hydrogen peroxide.

The other ingredients used to prepare fountain solutions are well known in the art. Formulations for such fountain solutions are contained in publications which include:

(1) Chemistry For The Graphic Arts;
(2) Lithographic Periodical;
(3) The Lithographers Manual; and
(4) Handbook for Graphic Communications Lithography.
(5) U.S. Pat. No. 3,354,824;
(6) European Patent Application No. 0 091 601

The invention has industrial applicability in the field of lithographic printing. A new composition and process are provided to decrease environmental impact and improve printing efficiency.

The following example illustrates the practice of the present invention.

EXAMPLE 1

Blue Chip Stock Fountain Solution (BCSFS) was prepard by using 2.0 fluid ounces of a commercially available Blue Chip fountain solution concentrate (from Rycoline Company of Chicago, Ill.) with one gallon of water. This was further diluted with isopropyl alcohol (90/10 by volume) and served as a control.

Three low viscosity cellulosic polymer solutions were prepared as follows:

A. Klucel® EF a hydroxypropylcellulose available from Aqualon Company was degraded with hydrogen peroxide to prepare solution. The degraded polymer product was used to prepare a 30% solids water solution with a pH of 2.7 and a viscosity at 25° C. of 600 cps. The solution was preserved using 0.15% by weight methyl parasept.

B. A hydrophobically modified hydroxyethylcellulose available as Natrosol® Plus from Aqualon Company was degraded with hydrogen peroxide. The degraded polymer product was used to prepare a 30% solids water solution with a pH of 3.5 and a viscosity at 25° C. of 2616 cps. The solution was preserved with 0.15% by weight methyl parasept.

C. A modified hydroxyethylcellulose available as AQU D3082 from Aqualon Company was degraded with hydrogen peroxide. Water was added to maintain the solid content above 41% by weight. The degraded polymer product was used to prepare a 41% solids water solution with a pH of 2.5 and a viscosity at 25° C. of 3800 cps. The solution was preserved with 0.15% by weight methyl parasept.

In order to show the effect of the additive to the stock fountain solution, tests were run in which no addition was made. The control and experimental formulations were tested on a Heidelberg Speed Master press for printability latitude and wet ink density at several different fountain solution supply settings (10–100). A lower setting meant that less fountain solution reached the printing plate (Viking available from 3M). Table 1 contains a summary of results showing wet ink density obtained or if scumming occurred.

TABLE 1

| Fountain Solution | BCSFS (no Add) | BCSFS + 10% IPA | BCSFS + 1% A | BCSFS + 1% B | BCSFS + 1% C |
|---|---|---|---|---|---|
| at 40 | scum | 1.35 | 1.35 | 1.37 | 1.37 |
| at 50 | scum | 1.35 | 1.37 | 1.31 | 1.31 |
| at 100 | scum | 1.21 | 1.20 | 1.17 | 1.17 |

As shown in the table, the stock solution is useless without either the prior art addition of IPA (isopropyl alcohol) or the solutions of the invention. Under the wide range of test conditions, the solutions of the invention gave wet printing densities within the range of the control without the undesirable risk of vapor or damage to lacquer finish.

What is claimed is:

1. An improved lithographic printing fountain solution comprising:

(a) an aqueous solution of a oxidatively degraded hydroxypropylcellulose or oxidatively degraded hydrophobically modified hydroxyethyl cellulose with a molecular weight between 5,000 and 100,000 wherein a 30% by weight solution has a viscosity below 4000 cps at 25° C.;

(b) a desensitizing agent;

(c) an acid and a buffer; and (d) a wetting agent or surfactant;

where the aqueous solution is used in an amount of about 1% by weight of the weight of the fountain solution.

2. The fountain solution of claim 1 having a pH of 5.0 or less.

3. The fountain solution of claim 2 containing hydroxypropylcellulose.

4. The fountain solution of claim 3 further comprising a preservative.

5. The fountain solution of claim 4 where the preservative is methyl parasept.

6. A method for using a fountain solution comprises the steps:

(a) replacing 10% by weight alcohol in a fountain solution with a hydroxypropylcellulose or hydrophobically modified hydroxyethyl-cellulose solution degraded with hydrogen peroxide to a molecular weight below 100,000 to prepare an acid fountain solution; and (b) applying the acid fountain solution to a printing plate to control scumming and to improve printing quality.

7. The method of claim 6 where the polymer is selected from hydroxypropylcellulose, hydrophobically modified hydroxyethylcellulose.

8. The method of claim 7 where the polymer is hydroxypropylcellulose.

9. The method of claim 8 where the fountain solution pH is 5.0 or below.

* * * * *